United States Patent
Wilson

(10) Patent No.: US 11,566,563 B2
(45) Date of Patent: Jan. 31, 2023

(54) OIL DISTRIBUTION SYSTEM FOR AN ENGINE

(71) Applicant: ROLLS-ROYCE plc, London (GB)

(72) Inventor: Paul Wilson, Derby (GB)

(73) Assignee: ROLLS-ROYCE PLC, London (GB)

( * ) Notice: Subject to any disclaimer, the term of this patent is extended or adjusted under 35 U.S.C. 154(b) by 137 days.

(21) Appl. No.: 17/016,510

(22) Filed: Sep. 10, 2020

(65) Prior Publication Data
US 2021/0079845 A1    Mar. 18, 2021

(51) Int. Cl.
*F02C 7/06* (2006.01)
*F02C 7/36* (2006.01)

(52) U.S. Cl.
CPC .................. *F02C 7/06* (2013.01); *F02C 7/36* (2013.01); *F05D 2240/50* (2013.01); *F05D 2260/608* (2013.01); *F05D 2260/98* (2013.01)

(58) Field of Classification Search
CPC .......... F02C 7/06; F02C 7/36; F05D 2240/50; F05D 2260/608; F05D 2260/98
See application file for complete search history.

(56) References Cited

U.S. PATENT DOCUMENTS

| | | | |
|---|---|---|---|
| 4,909,081 A * | 3/1990 | Kulczyk | G01N 15/0266 73/53.07 |
| 6,513,332 B2 | 2/2003 | Care et al. | |
| 8,943,837 B2 | 2/2015 | Care et al. | |
| 2002/0178729 A1 | 12/2002 | Care et al. | |
| 2011/0003331 A1 * | 1/2011 | Pavia | C12M 35/04 435/41 |
| 2014/0026583 A1 | 1/2014 | Care et al. | |
| 2014/0140824 A1 | 5/2014 | Sheridan | |
| 2018/0036664 A1 | 2/2018 | Beier et al. | |
| 2018/0214793 A1 | 8/2018 | Terada et al. | |

FOREIGN PATENT DOCUMENTS

| | | | | |
|---|---|---|---|---|
| DE | 20302824 U1 | 7/2004 | | |
| EP | 0455950 A1 | 11/1991 | | |
| EP | 2338580 A1 | 6/2011 | | |
| EP | 2572987 A2 | 3/2013 | | |
| EP | 2990713 A1 * | 3/2016 | ............ | F01D 25/20 |
| EP | 2990713 A1 | 3/2016 | | |
| GB | 2374026 A | 10/2002 | | |
| JP | 2012-026321 A | 2/2012 | | |
| JP | 2016-070083 A | 5/2016 | | |
| JP | 2016070083 A | 5/2016 | | |
| JP | 2018-62593 A | 4/2018 | | |
| SU | 603756 A1 | 4/1978 | | |

OTHER PUBLICATIONS

Feb. 5, 2021 Extended Search Report issued in European Patent Application No. 20192429.7.
Search Report of the Intellectual Property Office of the United Kingdom for GB1913435.2 dated Mar. 5, 2020.
Sep. 8, 2022 Office Action issued In European Application No. 20192429.7.

* cited by examiner

*Primary Examiner* — Steven M Sutherland
(74) *Attorney, Agent, or Firm* — Oliff PLC

(57) ABSTRACT

There is disclosed an arrangement for separating an air-oil mixture in an oil distribution system of an engine. The arrangement comprises a distribution channel of the system, which defines a fluid flowpath suitable for receiving the air-oil mixture, and an ultrasonic transducer configured to insonate the fluid flowpath.

12 Claims, 7 Drawing Sheets

OIL DISTRIBUTION SYSTEM FOR AN ENGINE

CROSS-REFERENCE TO RELATED APPLICATIONS

This specification is based upon and claims the benefit of priority from UK Patent Application Number 1913435.2 filed on 18 Sep. 2019, the entire contents of which are incorporated herein by reference.

BACKGROUND

Field of the Disclosure

The present disclosure concerns an oil distribution system for an engine, in particular to an apparatus for and method of separating an air-oil mixture in such a system.

Description of the Related Art

Many types of engines, such as conventional gas turbine engines for aircraft, typically incorporate an oil distribution system to provide lubrication, cooling and corrosion protection to gears, bearings and shaft couplings of the engines. Such oil distribution systems are important to maintain engine health and to ensure satisfactory engine operation and a long service life.

Most oil distribution systems are self-contained, circulatory systems. In particular, an oil distribution system is usually in the form of a network of channels that supply oil to components of the engine and return the same oil back to an oil tank for later use. The oil must therefore maintain its properties for repeated use through the service life of the engine, especially as it is not normal practice to change the engine oil during routine service. To do this, some stages of the oil distribution system may be configured to deliberately aerate the oil, so that it may be cooled to prevent overheating and loss of oil properties. It is also known that gases (air) may unintentionally leak into various stages of the oil distribution system and mix with the oil contained therein to form a mixture of oil and gas. Such stages of the oil distribution system, into which gas may leak or be deliberately introduced, shall be referred to herein as "aeration stages" of the oil distribution system. Further, the aerated oil, or indeed any mixture of gas and oil, that is produced in those stages is to be referred to herein as an "air-oil mixture".

In order to maintain normal functioning of the oil distribution system, the liquid phase and the gaseous phase of the air-oil mixture must be separated so that only the liquid oil is retained and recirculated about the system. To do this, the oil distribution system is typically provided with one or more separation stages, such as a centrifugal separation device or a centrifugal breather device, as is known in the art. Such devices operate on the principle of centrifugation, to separate an air-oil mixture by driving relatively heavy oil droplets present in an air-oil mixture out from a rotational axis towards a chamber wall of the device, where the oil is then collected and returned to the distribution network of the oil distribution system. The gases that are in the air-oil mixture remain relatively centrally, proximate to the rotational axis of the separation device and are then released through an outlet of the device and in turn the oil distribution system through a vent to the overboard section of the engine.

A problem with such centrifugal separation devices is that they are inefficient at separating small, and therefore light, oil droplets in the air-oil mixture. In particular, small oil droplets or particles do not always migrate to the chamber wall of the device and can often be carried by the gas after separation. As a result, some oil particles are lost from the oil distribution system and released overboard, which adversely affects the functioning of the oil distribution system and the wider engine. Additionally, the retention of oil in the gases after the separation stages can sometimes cause visible smoke to be exhausted overboard of the engine.

It is therefore desired to increase the efficiency of air-oil separation in an oil distribution system for a gas turbine engine.

SUMMARY

According to an aspect, there is provided an arrangement for separating an air-oil mixture in an oil distribution system of a gas turbine engine, comprising: a distribution channel of the system, wherein the distribution channel defines, at least in part, a fluid flowpath for receiving the air-oil mixture; and an ultrasonic transducer configured to transmit ultrasonic waves so as to insonate the fluid flowpath defined by the distribution channel.

The distribution channel may comprise at least one wall that is shaped to define, at least in part, the fluid flowpath. The ultrasonic transducer may be connected (e.g. directly or indirectly) to the at least one wall of the distribution channel.

An oscillating surface of the ultrasonic transducer may be interfaced with an outer surface of the at least one wall, so as to indirectly insonate the fluid flowpath through the at least one wall.

The ultrasonic transducer may be supported inside the distribution channel by the at least one wall. An oscillating surface of the ultrasonic transducer may be exposed to the fluid flowpath, so as to directly insonate the fluid flowpath.

The distribution channel may form part of a scavenge section of the oil distribution system.

The distribution channel may form part of a vent section of the oil distribution system.

The oil distribution network may comprise an aeration stage and a downstream separation stage that are fluidly connected by at least the distribution channel.

The ultrasonic transducer may be configured to insonate the fluid flowpath at a position that is closer to the aeration stage than the separation stage in a direction of fluid flow.

The aeration stage may be in the form of a bearing chamber, a gearbox or an oil tank of the oil distribution system.

The separation stage may be in the form of a centrifugal separation device.

The ultrasonic transducer may be configured to transmit a stepped frequency continuous wave signal.

According to an aspect of the disclosure, there is provided a method for separating an air-oil mixture received by a distribution channel of an oil distribution system in an engine, the method comprising: an ultrasonic transducer transmitting ultrasonic waves so as to insonate a fluid flowpath defined by the distribution channel.

The method may comprise any one or more or all of the functional features described herein in relation to the structural features of the disclosure. For example, the ultrasonic transducer may directly or indirectly insonate the fluid flowpath.

The ultrasonic transducer may transmit a stepped frequency continuous wave signal.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
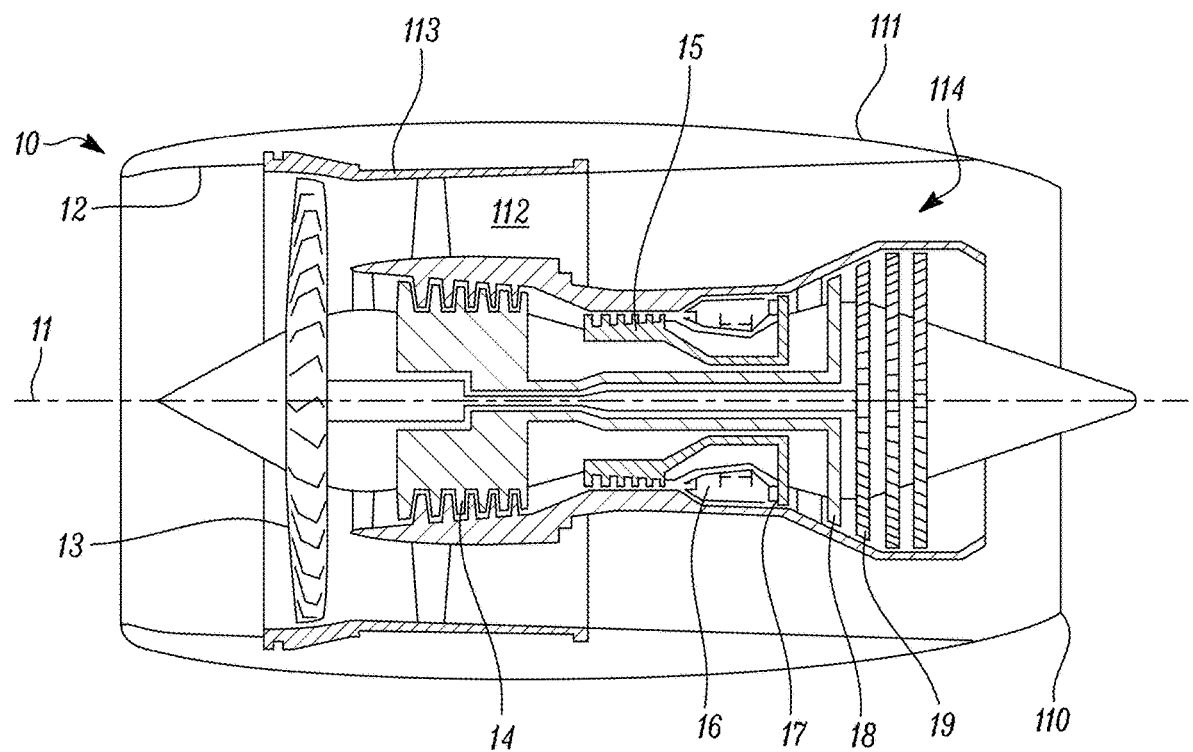
FIG. 1 is a sectional side view of a gas turbine engine.

It will be appreciated that like reference numerals are used throughout the drawings to refer to like features of the present disclosure.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 110. A nacelle 111 generally surrounds the engine 10 and defines both the intake 12 and the exhaust nozzle 110.

The gas turbine engine 10 works in the conventional manner so that air entering the intake 12 is accelerated by the fan 13 to produce two air flows: a first air flow into the intermediate pressure compressor 14 and a second air flow which passes through a bypass duct 112 to provide propulsive thrust. The fan 13 is surrounded by a fan casing 113 which at least partly defines the bypass duct 112. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 110 to provide additional propulsive thrust. The high 17, intermediate 18 and low 19 pressure turbines drive respectively the high pressure compressor 15, intermediate pressure compressor 14 and fan 13, each by suitable interconnecting shaft. The intermediate pressure compressor 14, the high-pressure compressor 15, the combustion equipment 16, the high-pressure turbine 17, the intermediate pressure turbine 18 and the low-pressure turbine 19 together define the engine core 114.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
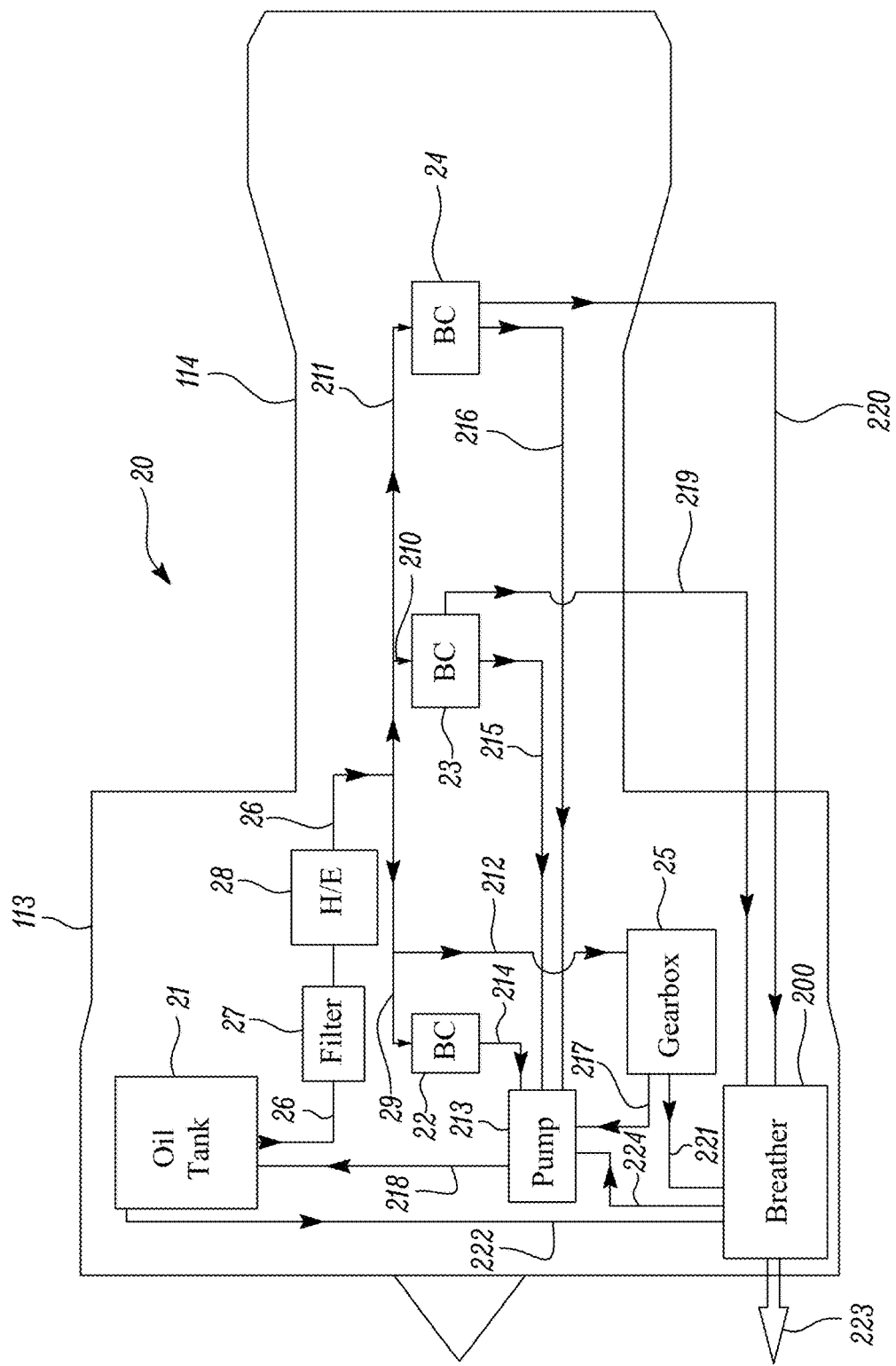
FIG. 2 is a schematic illustration of an oil distribution system for the gas turbine engine of FIG. 1.

FIG. 2 is a schematic illustration of an oil distribution system 20 for the gas turbine engine of FIG. 1. As shown, the system 20 is situated on radially outer sides of the fan casing 113 and the engine core 114, which are themselves radially inward of the engine nacelle (see reference 111 of the engine 10 described above with respect to FIG. 1).

The oil distribution system 20 is in the form of a network of channels that are fluidly connected to a common oil tank 21 and that are suitable for receiving and conveying oil and/or associated gases to and from various components of the gas turbine engine. The network of channels together define three complementary sections of the oil distribution system 20: a supply section; a scavenge section; and a vent section; each of which will now be described in turn.

The supply section is configured to provide a supply of (e.g. pressurised) oil from the oil tank 21 to various components of the engine as may be required for lubrication, cooling and corrosion protection etc. In the embodiment of FIG. 2, the supply section provides a supply of engine oil to a plurality of bearing chambers (BC), namely a compressor bearing chamber 22, a location bearing chamber 23 and a turbine bearing chamber 24, and also an engine gearbox 25.

The oil tank 21 is a housing which defines a reservoir within which oil is retained for use by the oil system 20. In use, oil is drawn from the reservoir of the oil tank 21 by a pump (not shown) and is received by a common supply channel 26 that defines a fluid flowpath along which the oil is to flow. The oil drawn into the common supply channel 26 from the oil tank 21 is then divided into separate supply channels 29, 210, 211, 212, each of which is fluidly connected to (and supplies oil to) a respective one of the bearing chambers 22, 23, 24 and gearbox 25. In the oil system shown in FIG. 2, the common supply channel 26 includes a filter 27 (to remove solid contaminants from the oil and protect downstream components of the system) and a heat exchanger 28 (to maintain a desired oil temperature), although this is not essential.

At the bearing chambers 22, 23, 24 and gearbox 25, the oil is used to, e.g., lubricate and/or cool, e.g. moving, components of the engine and thereby enhance their operation. After having performed these functions, the oil in each one of the bearing chambers 22, 23, 24 and gearbox 25 is directed to a stump (not shown) of the bearing chambers 22, 23, 24 or gearbox 25 in question, so that it may be collected by the scavenge section of the oil distribution system 20.

The scavenge section is configured to return oil that has been supplied to the bearing chambers 22, 23, 24 and gearbox 25 to the oil tank 21 as quickly as possible. To facilitate this, the sump of each bearing chamber 22, 23, 24 and gearbox 25 is in fluid communication with a scavenge pump assembly 213 via a respective one of four scavenge channels 214, 215, 216, 217. The scavenge pump assembly 213 is configured to drive oil received from the bearing chambers 22, 23, 24 and gearbox 25 to the oil tank 21 along a common oil-return channel 218.

As mentioned above, it is known that in some cases gases (air) can leak into various stages of the oil system and cause the oil to aerate and form an air-oil mixture. The bearing chambers 22, 23, 24 and gearbox 25 stages of the oil distribution system 20 are particularly susceptible to such leaks and in some cases may be configured to deliberately aerate the oil received therein, so as to cool the oil, for example. Accordingly, the bearing chambers 22, 23, 24 and gearbox 25 may be considered as aeration stages of the oil distribution system 20.

In order to separate the engine oil from the two-phase air-oil mixture present in the channels of the scavenge section, the oil-return channel 218 is fluidly connected to a centrifugal separation device. Although not shown, the centrifugal separation device is located, e.g. immediately, upstream of the oil tank reservoir, and in this case within the oil tank 21. As mentioned above, the centrifugal separation device is operable to separate the air-oil mixture by driving oil droplets, received from the single oil-return channel 218, outwards towards a chamber wall of the device, where the oil is then collected and stored in the reservoir of the tank 21. The centrifugal separation device may be referred to in the art as a "de-aerator", a "cyclone separation device" or a "centrifugal separation device" interchangeably.

The gases removed inside the centrifugal separation device or the wider oil tank 21 are then released through a gas outlet of the (e.g. separation device of the) tank 21 and directed overboard of the engine via the vent section of the oil distribution system 20.

The vent section is provided to evacuate from the oil distribution system 20 the gases that have leaked or otherwise been introduced therein. The vent section includes a centrifugal breather device 200, as is known in the art. The (e.g. separation device of the) tank 21, the bearing chambers 23, 24 and the gearbox 25 of the oil distribution system are fluidly connected to the breather device 200 such that the breather device 200 is suitable for receiving the gases exhausted from those components. In particular, a gas outlet of the location bearing chamber 23 is fluidly connected to a first inlet of the breather device 200 by a first vent channel 219; a gas outlet of the turbine bearing chamber 24 is fluidly connected to a second inlet of the breather device 200 by a second vent channel 220; a gas outlet of the engine gearbox 25 is fluidly connected to a third inlet of the breather device 200 by a third vent channel 221; and a gas outlet of the (separation device of the) oil tank 21 is fluidly connected to a fourth inlet of the breather device 200 by a fourth vent channel 222. In other arrangements, the outlets of one or more of the oil tank 21, bearing chambers 23, 24 and gearbox 25 may combine to form a common vent channel to the breather device 200.

The vent channels are predominantly for receiving gas flows from the oil tank 21, bearing chambers 23, 24 and gearbox 25, as opposed to the predominantly oil-based fluid that flows though the channels of the supply and scavenge sections of the oil system. However, the gas vented from the oil tank 21, the bearing chambers 23, 24 and gearbox 25 will often contain particles of oil, and in that regard the gases received by the vent channels may be regarded as air-oil mixtures.

The centrifugal breather device 200 is operable to separate the air-oil mixture received at the breather device 200 into the liquid and gas phases thereof. The separated gas is expelled from the breather device 200 to the overboard of the engine (as represented by the arrow 223 of FIG. 2) via a vent opening (not shown). The separated oil, however, is retained and returned to the scavenge section of the oil distribution system, particularly the scavenge pump assembly 213, via a fifth scavenge channel 224. The oil is then returned to the oil tank 21 via the oil-return channel 218.

As mentioned above, a problem with the air-oil separation stages of the oil distribution system 20 is that they are inefficient at separating relatively small and lightweight oil droplets, which may be airborne, from the surrounding air-oil mixture. The present disclosure, however, can realise more efficient separation of the gaseous and fluid phases of the air-oil mixture by subjecting the air-oil mixture to ultrasonic excitation energy. In particular, the present disclosure utilises an ultrasonic transducer that is configured to insonate the fluid flowpath defined by a given distribution channel of the oil distribution system, as will be described in further detail below.

Figure 3:
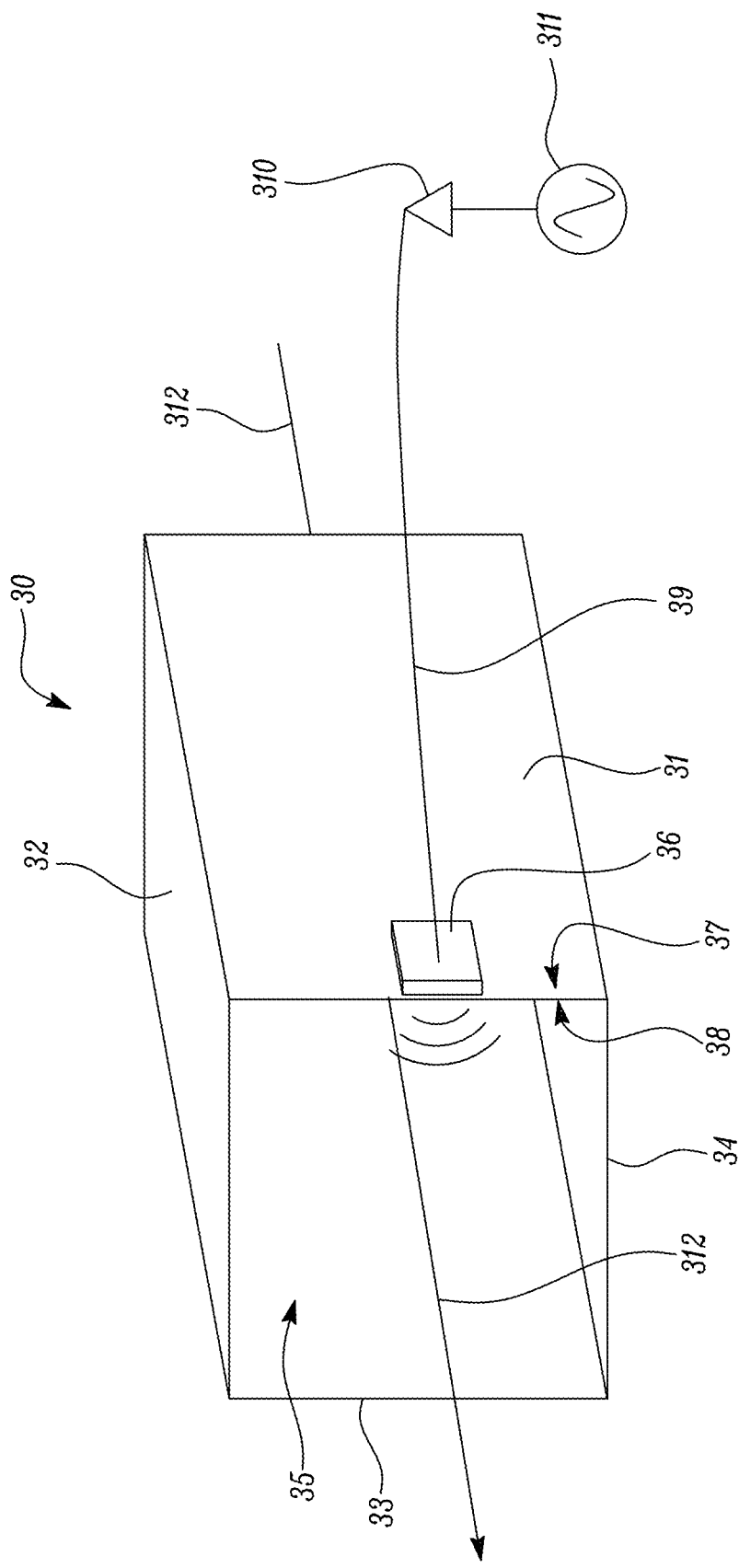
FIG. 3 is a schematic illustration of an arrangement for separating an air-oil mixture in the oil distribution system of FIG. 2, according to a first embodiment of the present disclosure.

FIG. 3 is a schematic illustration of an arrangement for separating an air-oil mixture in an oil distribution system, which may be that described above with respect to FIG. 2 (and therefore like parts of the oil distribution system are given like reference numerals).

As shown, the arrangement includes a distribution channel 30, which may form at least a part of the network of channels that together define the overall oil distribution system. Accordingly, the channel 30 may form some or all of the scavenge section and/or vent section of the oil distribution system 20 described above.

The channel 30 is suitable for conveying and transporting an oil, gas or air-oil mixture between different components of the oil distribution system. The channel 30 may directly connect an aeration stage of the oil system with a corresponding separation stage (which is downstream of the aeration stage). For example, a first end of the channel 30 may connect to an outlet of an aeration stage of the oil system 20 and a second end of the channel 30, which is longitudinally opposite the first end, may connect to an inlet of a separation stage of the oil system 20. In other embodiments, the channel 30 may indirectly connect an aeration stage of the oil system with a corresponding downstream separation stage. That is, the channel 30 may form only a part of a set of plural channels connecting one or more aeration stages with a corresponding separation stage of the oil system 20. In either case, the channel is configured to receive an air-oil mixture.

As shown in FIG. 3, the channel 30 comprises a first wall 31, a second wall 32, a third wall 33 and a fourth wall 34, which extend longitudinally about a longitudinal axis of the channel 30 to define an internal fluid flowpath 35 along which an air-oil mixture may flow. The air-oil mixture may flow in a fluid flow direction 312 between both ends of the channel 30.

As shown in FIG. 3, the walls 31, 32, 33, 34 of the channel 30 are arranged to define a substantially square shape in cross-section, but it will be appreciated that other cross-sectional shapes would be equally possible for defining a channel suitable for receiving the air-oil mixture. Furthermore, while the channel 30 of FIG. 3 has four walls, it may have more or less walls, as desired. For example, the channel may have a single wall which is, e.g., shaped to define a circular shape in cross-section and form a hollow tube within which the air-oil mixture is to be received. The channel 30 may be sealed to liquid and gas in that the wall(s) are shaped so as to entirely surround the longitudinal and fluid flow direction 312 of the flowpath 35, between the longitudinal ends of the channel 30.

In the embodiment of FIG. 3, the channel 30 is provided with a first ultrasonic transducer 36 which is attached to the exterior of the channel 30, in particular an outer surface 37 of the first wall 31 (although it will be appreciated that the transducer 36 may be located on the outer surface of any wall of the channel 30). The transducer 36 is electrically connected, via cabling 39, to an amplifier 310 coupled to a signal generator 311. The signal generator 311 is configured to generate an ultrasonic wave signal and the amplifier is configured to amplify that signal before it is then transmitted as ultrasonic wave energy by the first ultrasonic transducer 36. The transducer may be a piezoelectric transducer or a capacitive transducer, as is known in the art.

By being located on an outer surface 37 of the first wall 31, the transducer 36 is configured to insonate the flowpath 35 through the first wall 31. In that way, the first transducer can be said to be configured so as to indirectly insonate the flowpath 35. To maximise the ultrasonic wave coupling at the interface between the transducer 36 and the outer surface 37 of the first wall 31, an oscillating surface of the transducer 36, which is interfaced with the outer surface 37 of the first wall 31, is shaped to conform to and match the shape of the outer surface 37 of the first wall 31. In this particular embodiment, the outer surface 37 of the first wall 31 and the interfacial surface of the transducer 36 conform in that they are both planar.

Although the ultrasonic transducer shown in FIG. 3 is located at a position that is outside the channel 30, in other embodiments an ultrasonic transducer may instead be provided within the channel 30 itself, as will now be described with respect to FIG. 4.

Figure 4:
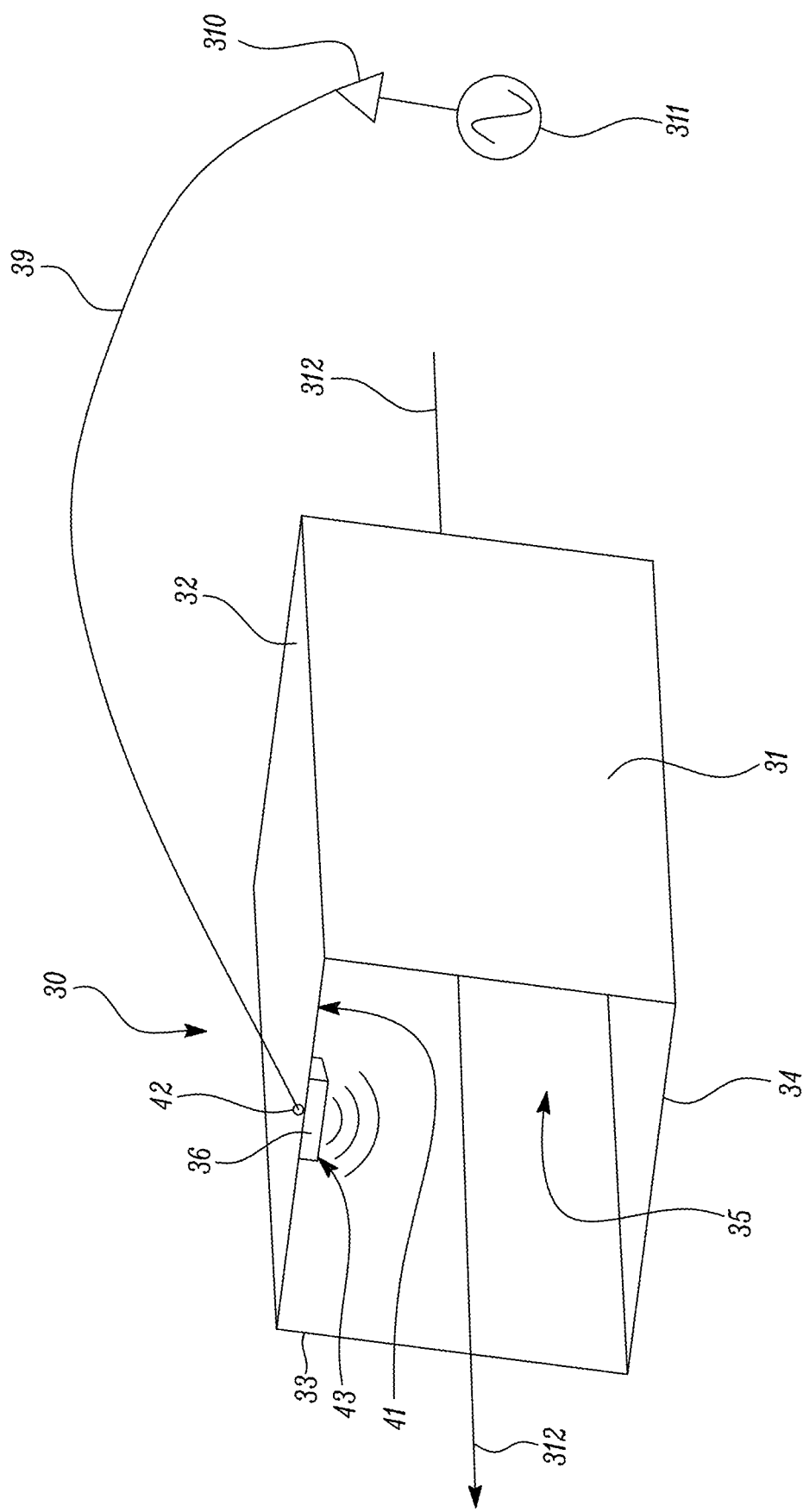
FIG. 4 is a schematic illustration of an arrangement for separating an air-oil mixture in the oil distribution system of FIG. 2, according to a second embodiment of the present disclosure.

FIG. 4 is a schematic illustration of another arrangement for separating an air-oil mixture in an oil distribution system, which may be that described above with respect to FIG. 2 (and therefore like parts of the oil distribution system are given like reference numerals).

As shown, the arrangement of FIG. 4 includes a channel 30 and a second ultrasonic transducer 36, cabling 39, amplifier 310 and signal generator 311, each of which are substantially the same as those described above with respect to FIG. 3. However, in the present arrangement the second ultrasonic transducer 36 is not provided on an outer surface of the channel 30, but is instead located on an inner surface 41 thereof. In particular, the second ultrasonic transducer 36 is attached on an inner surface 41 of the second wall 32 of the channel 30, although it will be appreciated that the second transducer 36 may be located on the inner surface of any wall of the channel 30. It will also be appreciated that the second ultrasonic transducer 36 may be held at a position that is spaced from the walls of the channel 30 that define the flowpath 35. For example, the transducer 36 may be held by a support member (not shown) that extends inwards from the inner surface 41 of the second wall 32.

The transducer 36 in the embodiment of FIG. 4 is electrically connected to an amplifier 310 and signal generator 311 via cabling 39 that extends through a hole 42 in the second wall 32 of the channel 30.

The second transducer 36 is configured to directly insonate the flowpath 35 of the channel 30 in that an oscillating surface 43 of the second transducer 36 is exposed to the flowpath 35. In this way, the ultrasonic wave energy that is emitted by the transducer 36, in use, does not insonate the flowpath 35 via an intermediate medium, such as a wall of the channel 30.

It will be appreciated herein that although the arrangement of the present disclosure has been described above with respect to FIGS. 3 and 4 as having a single ultrasonic transducer, in embodiments a given channel 30 of the oil distribution system will have a set of plural ultrasonic transducers, and the number of ultrasonic transducers used may depend on the extent of ultrasonic excitation required on a case-by-case basis, for example. All of the ultrasonic transducers in the set may be configured exclusively to indirectly insonate the flowpath 35, as described above with respect to FIG. 3, or to directly insonate the flowpath 35, as described above with respect to FIG. 4. In other embodiments, the set may be divided into a first subset of transducers configured to indirectly insonate the flowpath and a second subset of transducers configured to directly insonate the flowpath.

Where the channel 30 is provided with a set of plural ultrasonic transducers, the transducers may be connected to a common amplifier 310 via a switching matrix (not shown), which is configured to selectively transmit the ultrasonic wave signal to a subset of one or more of the transducers in the set, as required. In other embodiments, however, there may be a plurality of signal generators and associated amplifiers, where each ultrasonic transducer may be connected to a respective one of the signal generators via its associated amplifier.

Figure 5:
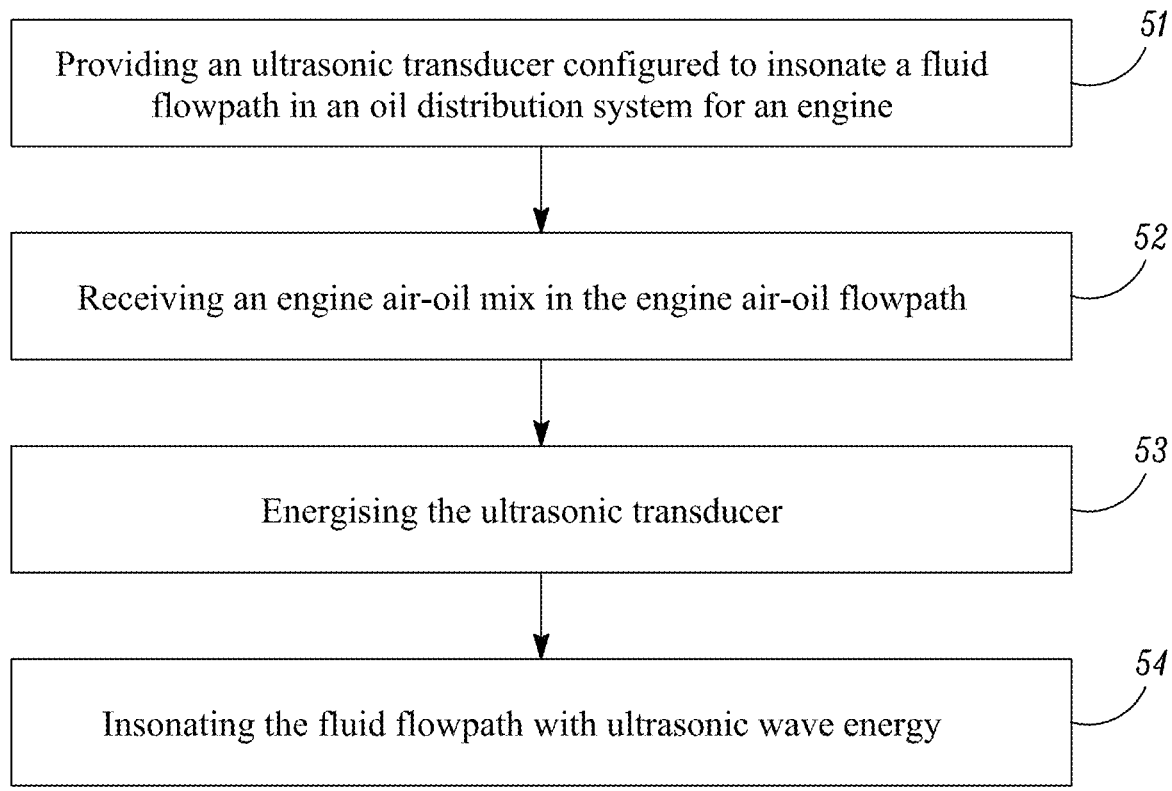
FIG. 5 is a flowchart schematically illustrating an air-oil separation method.

FIG. 5 shows a flowchart of an air-oil mixture separation method that is to be carried out with the arrangement of FIG. 3 or 4.

The method begins at step 51 where an oil distribution system 20 of a gas turbine engine 10 is provided with an arrangement for separating an air-oil mixture. In particular, at least one distribution channel 30 of the oil distribution system 20 is provided with one or more ultrasonic transducers 36 that is configured to insonate a flowpath 35 defined by the channel(s) 30 in question. As mentioned above, this may include attaching an ultrasonic transducer 36 to an outer wall of the channel 30, such that an oscillating surface of the transducer 36 interfaces with the outer wall of the channel. Alternatively, the ultrasonic transducer may be provided inside the channel 30 so that the oscillating surface of the transducer 36 is directly exposed to the flowpath.

It will be appreciated step 51 may be performed at manufacture of the oil distribution system 20 or the wider gas turbine engine, i.e. before its first use. However, the present disclosure is suitable for being retrofitted to pre-manufactured oil systems and/or engines, and in embodiments that is what is done at step 51. In particular, the ultrasonic transducer(s) may be readily fitted to a pre-existing channel of an oil system of a gas turbine engine. This is in contrast to hypothetical arrangements in which one may, e.g., have to restructure pre-existing components of the oil system in order to incorporate means of enhancing air-oil separation.

At step 52, the oil distribution system 20 is used during operation of the gas turbine engine 10 to circulate oil to an aeration stage of the system, such as a bearing chamber or gearbox. The oil is aerated at the aeration stage and subsequently received at the distribution channel 30 of the system, which is downstream of the aeration stage, in a fluid flow direction along its fluid flowpath.

At this point the signal generator 311 is energised and operates to generate, at step 53, an ultrasonic wave signal which is amplified by the amplifier 310 and then transmitted as ultrasonic wave energy by the ultrasonic transducer 36. The wave signal generated by the signal generator 311 may be a continuous wave signal in that it has a constant frequency within the ultrasonic frequency range, i.e. at least 20 KHz range.

Alternatively the signal generator 311 may generate a stepped frequency continuous wave (CW) signal which is a sequential series of pulses of continuous wave energy, where each pulse has its frequency stepped, e.g. up, across the ultrasonic range of frequencies. This may be advantageous in that it allows the intensity of the ultrasonic wave, and therefore the extent to which the air-oil mixture is excited by the ultrasonic energy, to be varied during operation of the engine. In that regard, the demand for ultrasonic excitation may change for different operating conditions of the oil system and wider engine. For example, the demand at idle engine operating conditions may be different to that at Maximum Take Off (MTO) engine conditions. Accordingly, stepping the frequency of the ultrasonic wave signal may be used to accommodate demand changes and ensure that the most suitable frequency is used at any given time during operation.

At step 54, the ultrasonic wave signal transmitted by the transducer 36 insonates the fluid flowpath defined by the channel 30. Where the ultrasonic transducer 36 is configured to indirectly insonate the flowpath, the ultrasonic wave energy that is transmitted by the transducer 36 is carried and transmitted in turn by the first wall 31, particularly an inner surface 38 of the first wall 31, before entering the interior of the channel 30 and in turn energising the air-oil mixture received therein. Where the ultrasonic transducer 36 is configured to directly insonate the flowpath, however, the ultrasonic wave energy is directly imparted to the air-oil mixture flowing through the channel 30.

It will be appreciated that any two or more of steps 52, 53 and 54 may be performed concurrently if desired.

By indirectly or directly insonating the flowpath 35, the air-oil mixture travelling along the flowpath 35 will be subjected to ultrasonic wave energy. In this way, oil particles contained within the air-oil mixture will be caused to oscillate beyond a level which would otherwise occur naturally in hypothetical arrangements in which the flowpath is not subjected to ultrasonic wave energy. This increased oscillation can cause neighbouring oil particles to contact each other and coalesce to form larger, heavier oil particles. A further effect of this increased oscillation is that more oil particles will be brought into contact with the walls of the channel 30, thereby forming an increasingly thicker layer of oil along the channel and facilitating further coalescence with other oil particles.

By forming larger and heavier oil particles within a channel or channels of the oil distribution system 20, the present disclosure may increase the separation efficiency of a downstream (centrifugal) separation stage that is to receive the air-oil mixture from the channel 30. For example, by increasing the size and weight of oil particles in the air oil mixture, a greater amount of oil will be driven towards a chamber wall of a centrifugal separation device. Accordingly a greater amount of oil will be removed from the air-oil mixture and returned to the distribution network of the oil system, thereby enhancing operation and increasing the service life of the oil distribution system and engine.

Although the disclosure has been described above as being applicable to any given distribution channel of the oil distribution system, the Applicant has recognised that it may be desirable for the disclosure to be applied to the scavenge and/or vent sections of the oil distribution system, in particular.

Figure 6:
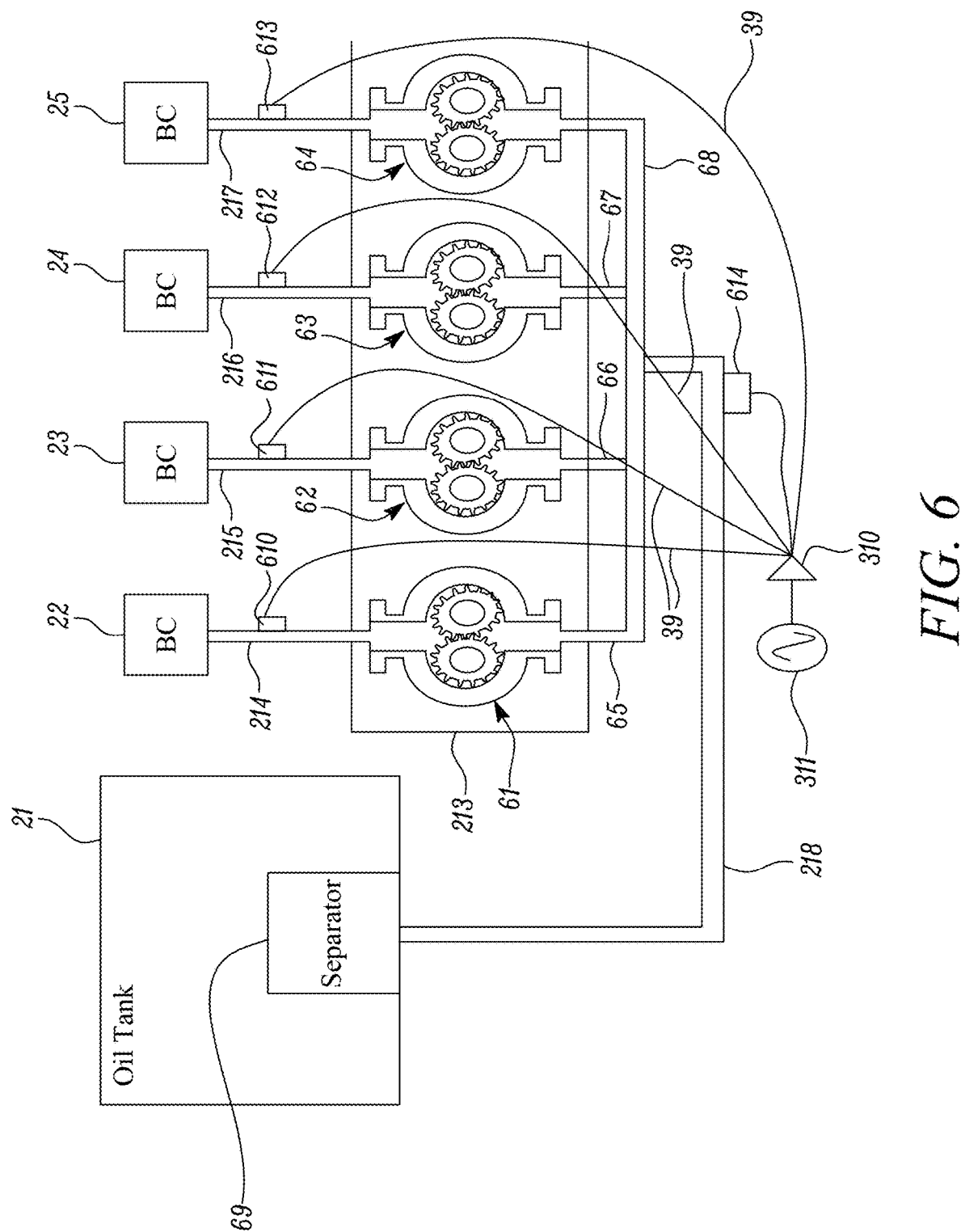
FIG. 6 is a schematic illustration of a scavenge section of the oil distribution system of FIG. 2, according to an embodiment of the present disclosure.

FIG. 6 schematically illustrates the arrangement of the present disclosure implemented in the scavenge section of the oil system 20 described above with respect to FIG. 2 (and therefore like parts of the oil distribution system are given like reference numerals).

As shown, the sumps of a first, second and third bearing chamber 22, 23, 24 (i.e. the compressor, location and turbine bearing chambers) are respectively fluidly connected to inlets of first, second and third scavenge pumps 61, 62, 63 via a first scavenge channel 214, a second scavenge channel 215, a third scavenge channel 216. Additionally, the sump of a first gearbox 25 is fluidly connected, via a fourth scavenge channel 217, to an inlet of a fourth scavenge pump 64 within the scavenge pump assembly 213. The first, second, third and fourth scavenge pumps 61, 62, 63, 64 have respective first, second, third and fourth outlet channels 65, 66, 67, 68 that are combined and connected to a first end of a common oil-return channel 218. A second end of the oil-return channel 218 is fluidly connected to an oil tank 21, such that oil received within the channel 30 from the bearing chambers 22, 23, 24, 25 and gearbox 25 may be introduced into the tank via a centrifugal separation device 69. However, it will be appreciated that the oil return channel 218 may instead be fluidly connected to the oil tank 21 via one or more other components, such as a scavenge filter (not shown).

In this way, the first scavenge channel 214, the first outlet channel 65 and the oil-return channel 218 together define a first fluid flowpath between the first bearing chamber 22 and the oil tank 21 (particularly the separation stage 69 of the oil tank 21), along which an air-oil mixture can travel in a first flow direction from the first bearing chamber 22 to the separation stage 69 of the oil tank 21. The second scavenge channel 215, the second outlet channel 66 and the oil-return channel 218 together define a second fluid flowpath between the second bearing chamber 23 and the separation stage 69 of the oil tank 21, along which an air-oil mixture can travel in a second flow direction from the second bearing chamber 23 to the separation stage 69 of the oil tank 21. The third scavenge channel 216, the third outlet channel 67 and the oil-return channel 218 together define a third fluid flowpath between the third bearing chamber 24 and the separation stage 69 of the oil tank 21, along which an air-oil mixture can travel in a third flow direction from the third bearing chamber 24 to the separation stage 69 of the oil tank 21. The fourth scavenge channel 217, the fourth outlet channel 68 and the oil-return channel 218 together define a fourth fluid flowpath between the first gearbox 25 and the separation stage 69 of the oil tank 21, along which an air-oil mixture can travel in a fourth flow direction from the first gearbox 25 to the separation stage 69 of the oil tank 21.

A first ultrasonic transducer 610 is attached to an outer wall of the first scavenge channel 214, a second ultrasonic transducer 611 is attached to an outer wall of the second scavenge channel 215, a third ultrasonic transducer 612 is attached to an outer wall of the third scavenge channel 216, a fourth ultrasonic transducer 613 is attached to an outer wall of the third scavenge channel 217, and a fifth ultrasonic transducer 614 is attached to an outer wall of the oil-return channel 218. Each ultrasonic transducer is attached to its respective channel in the manner described above with respect to FIG. 3, such that it is configured to indirectly insonate the flowpath defined by the channel in question. Additionally, the ultrasonic transducers 610, 611, 612, 613, 614 are connected to a common amplifier 310 and signal generator 311.

In use, an air-oil mixture travelling along the flowpaths in the fluid flow directions will be subjected to ultrasonic wave energy at positions that are proximate the transducers, and accordingly begin to separate the two phases of the air-oil mixture at positions along the flowpaths that are upstream of the oil tank 21 in the fluid flow direction. By starting the air-oil separation at a position that is upstream of the separation stage of the oil tank 21, larger and heavier oil particles will be formed along the channel before they reach the separation stage (as compared to arrangements where ultrasonic excitation of the air-oil mixtures is not performed), thereby enhancing the downstream centrifugal separation process.

In the example arrangement shown in FIG. 6, each one of the first, second, third and fourth ultrasonic transducers 610, 611, 612, 613 is located at a position along its respective flowpath that is closer to its associated bearing chamber 22, 23, 24 or gearbox 25 than the oil tank 21, in the fluid flow direction. As a result, in use the separation process will begin at a position that is closer to the aeration stage of the oil system than the separation stage, such that the extent by which the two phases of the mixture are separated before entry to the separation stage, and thus the separation efficiency of the separation stage, is increased.

Although the present disclosure has been described above as being advantageous for enhancing the efficiency of a downstream centrifugal separation stage of the oil tank 21, the present disclosure may separate the two phases of an air-oil mixture to such an extent that it obviates the need for the centrifugal separation stage of the oil tank 21. Accordingly, in some embodiments the scavenge section does not include a centrifugal separation device stage (device) for separating the air-oil mixture. Instead, the oil-return channel 218 of the scavenge section may be connected directly to a reservoir within the oil tank 21, so that oil within the channel passes directly to the oil reservoir from the channel, without passing through a separation stage. This may be in contrast to conventional arrangements in which the oil-return channel of a scavenge section is fluidly connected to a reservoir of an oil tank via an intermediate oil separation stage, such as a centrifugal separation device described above.

Figure 7:
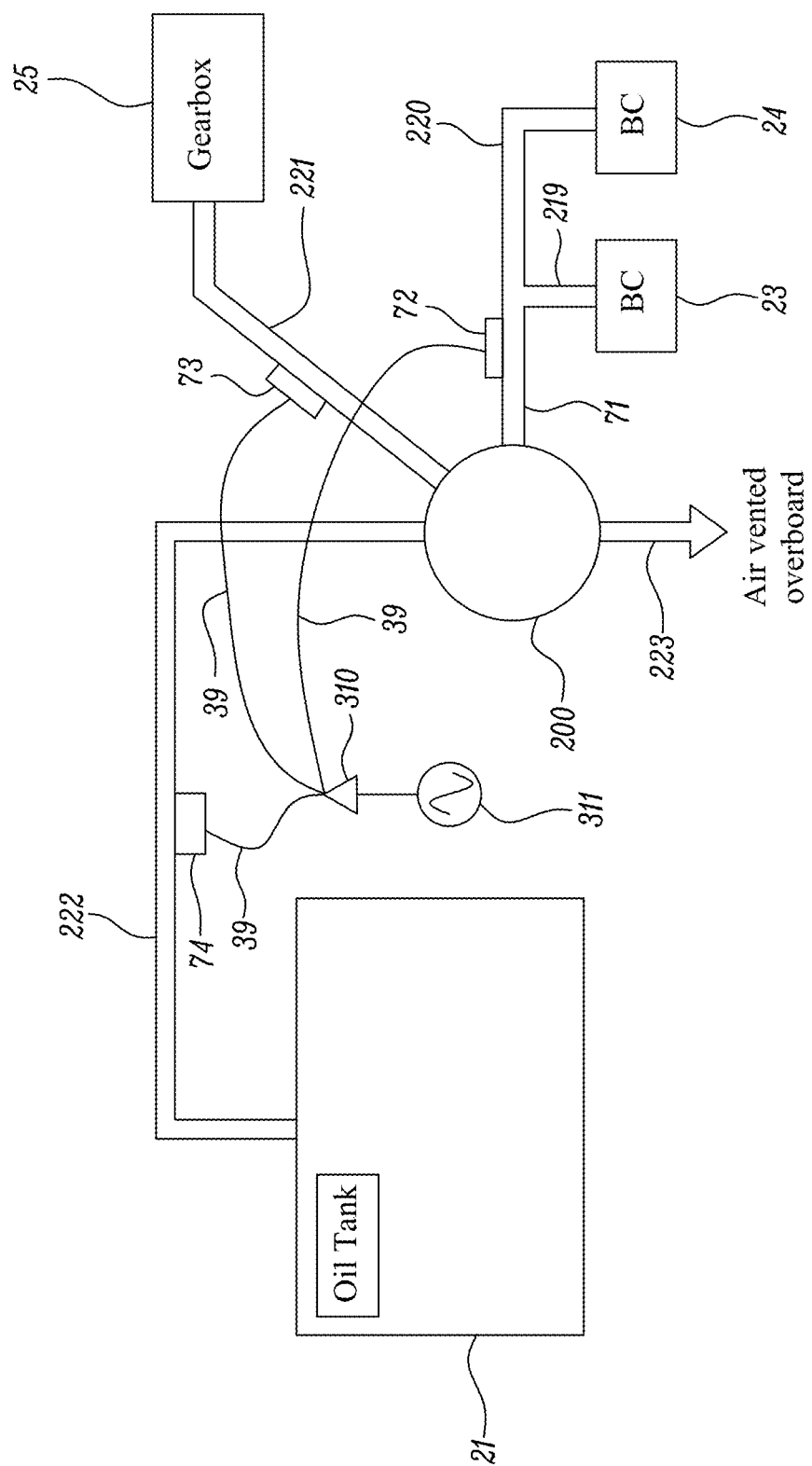
FIG. 7 is a schematic illustration of a vent section of the oil distribution system of FIG. 2, according to an embodiment of the present disclosure.

FIG. 7 schematically illustrates the arrangement of the present disclosure implemented in the vent section of the oil system 20 described above with respect to FIG. 2.

The vent section includes a centrifugal breather device 200 which includes a plurality of inlets, each respective inlet being fluidly connected to a respective one of the oil tank 21, the (location and turbine) bearing chambers 23, 24 and the gearbox 25. In particular, a gas outlet of the location bearing chamber 23 is fluidly connected to the breather device 200 by a first vent channel 219; a gas outlet of the turbine bearing chamber 24 is fluidly connected to the breather device 200 by a second vent channel 220; a gas outlet of the engine gearbox 25 is fluidly connected to the breather device 200 by a third vent channel 221; and a gas outlet of the separation device (not shown) of the oil tank 21 is fluidly connected to the breather device 200 by a fourth vent channel 222. The first vent channel 219 and the second vent channel 220 combine to form a common vent channel 71 fluidly connected to an inlet to the breather device 200.

The first vent channel 219 and the common vent channel 71 together define a first flowpath for directing a fluid flow in a direction from the location bearing chamber 23 to the breather device 200. The second vent channel 220 and the common vent channel 71 together define a second flowpath for directing a fluid flow in a direction from the turbine bearing chamber 23 to the breather device 200. The third vent channel 221 defines a third flowpath for directing a fluid flow in a direction from the engine gearbox 25 to the breather device 200. The fourth vent channel 222 defines a fourth flowpath for directing a fluid flow in a direction from the separation device (not shown) to the breather device 200.

The fluid that is to be received by the respective flowpath channels, in use, will be gas that is vented from one of the oil tank 21, the bearing chambers 23, 24 and gearbox 25. However, as mentioned above, such fluid will contain particles of oil that form an air-oil mixture that is to be separated at the breather device 200 by centrifugal separation. The breather device 200 is fluidly connected to a vent (not shown), from which the gas separated from the air-oil mixture may be expelled from the breather device 200 overboard of the engine (as represented by the arrow 223). The separated oil will be retained and returned to the scavenge section of the wider oil distribution system, substantially as described above with respect to FIGS. 2 and 5.

A first ultrasonic transducer 72 is attached to an outer wall of the common vent channel 71, a second ultrasonic transducer 73 is attached to an outer wall of the third vent channel 221 and a third ultrasonic transducer 74 is attached to an outer wall of the fourth vent channel 222. The ultrasonic transducers 72, 73, 74 are configured to indirectly insonate the flowpaths defined by their respective channels, substantially in the manner described above with respect to FIG. 3. Additionally, the ultrasonic transducers 72, 73, 74 are connected to a common amplifier 310 and signal generator 311, as described above with respect to FIGS. 3 and 4.

In use, an air-oil mixture travelling in the fluid flow directions along the respective flowpaths will be subjected to ultrasonic wave energy at positions proximate the transducers, so as to separate the two phases of the air-oil mixture at positions along the flowpaths that are upstream of the breather device 200 in the fluid flow direction. This may be advantageous in that larger and heavier oil particles will reach the breather device 200, compared to arrangements where ultrasonic excitation of the air-oil mixtures is not performed, thereby enhancing the centrifugal separation process.

Although not shown in the example embodiment of FIG. 7, the ultrasonic transducers 72, 73, 74 may be positioned along their respective flowpaths at locations that are closer to their respective aeration stages, i.e. the bearing chambers 23, 24, gearbox 25 or oil tank 21, in the fluid flow direction.

Furthermore, although only the location bearing chamber 23 and the turbine bearing chamber 24 is shown to be fluidly connected to the breather device 200, it will be appreciated than one or more or all of the bearing chambers of the turbine engine may be connected thereto. Additionally, any one or more or all of the channels that (directly or indirectly) connect a given bearing chamber, gearbox or oil tank to the breather device 200 may be provided with an ultrasonic transducer configured to insonate the flowpath defined by the channel(s) in question.

It will be appreciated that although the disclosure has been described above with respect to FIGS. 6 and 7 as having ultrasonic transducers that are configured to indirectly insonate their associated flowpaths, it is equally possible, and in some cases preferable, for the transducers to be configured to directly insonate the flowpaths, in a manner substantially as described above with respect to FIG. 4.

Although the present disclosure has been described above as being advantageous for enhancing the efficiency of a downstream breather device 200 of the vent section 70, the present disclosure may separate the two phases of an air-oil mixture to such an extent that it obviates the need for such a device 200. Accordingly, in some embodiments the vent section does not include a breather device 200 for separating the air-oil mixture. Instead, the channels 71, 221, 222 for receiving exhausted gases from the separation stages may be connected directly to a vent of the vent section, so that gases pass directly overboard without passing through a separation stage. In such arrangements, however, each channel may include a sump so that oil droplets that have been separated from the exhausted gases may be syphoned from those channels and returned to the scavenge section.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. An oil distribution system of a gas turbine engine, the oil distribution system comprising:
 a bearing chamber;
 a scavenge pump;
 an oil tank that includes a separation stage;
 a first channel that defines a first fluid flow path between the bearing chamber and the scavenge pump;
 a second channel that defines a second fluid flow path between the scavenge pump and the oil tank;
 a first ultrasonic transducer located along the first channel between the bearing chamber and the scavenge pump and configured to transmit ultrasonic waves so as to isonate the first fluid flow path defined by the first channel; and
 a second ultrasonic transducer located along the second channel between the scavenge pump and the oil tank and configured to transmit ultrasonic waves so as to insonate the second fluid flow path defined by the second channel.

2. The oil distribution system of claim 1, wherein:
 the first channel comprises at least one first wall that is shaped to define, at least in part, the first fluid flow path and the first ultrasonic transducer is connected to the at least one first wall of the first channel; and
 the second channel comprises at least one second wall that is shaped to define, at least in part, the second fluid flow path and the second ultrasonic transducer is connected to the at least one second wall of the second channel.

3. The oil distribution system of claim 2, wherein:
 a first oscillating surface of the first ultrasonic transducer is interfaced with an outer surface of the at least one first wall, so as to indirectly insonate the first fluid flow path through the at least one first wall; and
 a second oscillating surface of the second ultrasonic transducer is interfaced with an outer surface of the at least one second wall, so as to indirectly insonate the second fluid flow path through the at least one second wall.

4. The oil distribution system of claim 2, wherein:
 the first ultrasonic transducer is supported inside the first channel by the at least one first wall and an oscillating surface of the first ultrasonic transducer is exposed to the first fluid flow path so as to directly insonate the first fluid flow path; and
 the second ultrasonic transducer is supported inside the second channel by the at least one second wall and an oscillating surface of the second ultrasonic transducer is exposed to the second fluid flow path so as to directly insonate the second fluid flow path.

5. The oil distribution system of claim 1, wherein:
 the bearing chamber forms part of an aeration stage and the oil tank forms part of a downstream separation stage that are fluidly connected by at least the first channel, the scavenge pump and the second channel.

6. The oil distribution system of claim 5, wherein:
 the second ultrasonic transducer is configured to insonate the second fluid flow path at a position that is closer to the aeration stage than the separation stage in a direction of fluid flow.

7. The oil distribution system of claim 6, wherein the aeration stage includes the bearing, chamber and the scavenge pump.

8. The oil distribution system of claim 5, wherein the separation stage of the oil tank includes a centrifugal separation device.

9. The oil distribution system of claim 1, wherein the first ultrasonic transducer and the second ultrasonic transducer are configured to transmit a stepped frequency continuous wave signal.

10. A method for separating an air-oil mixture in the oil distribution system of claim 1, the method comprising:
 transmitting ultrasonic waves to the first ultrasonic transducer and the second ultrasonic transducer so as to insonate the first fluid flow path and the second fluid flow path, respectively.

11. The method of claim 10, the first ultrasonic transducer and the second ultrasonic transducer transmit a stepped frequency continuous wave signal.

12. The oil distribution system of claim 1, wherein:
 the bearing chamber includes a plurality of bearing chambers;
 the scavenge pump includes a plurality of scavenge pumps;
 the first channel includes a plurality of first channels that define a respective first fluid flow path between one bearing chamber of the plurality of bearing chambers and one scavenge pump of the plurality of scavenge pumps; and
 the first ultrasonic transducer includes a plurality of first ultrasonic transducers with one first ultrasonic transducer of the plurality of first ultrasonic transducers being provided for each first channel of the plurality of first channels; and
 the second ultrasonic transducer includes only one second ultrasonic transducer between the plurality of scavenge pumps and the oil tank.

\* \* \* \* \*